United States Patent

[11] 3,576,950

[72] Inventor Nikola Ljotic Jovic
Chicago, Ill.

[21] Appl. No. 771,453
[22] Filed Oct. 29, 1968
[45] Patented May 4, 1971
[73] Assignee International Telephone and Telegraph Corporation
New York, N.Y.

[54] SELF-SEEKING ELECTRONIC SWITCHING NETWORK
10 Claims, 4 Drawing Figs.

[52] U.S. Cl. .......... 179/18
[51] Int. Cl. .......... H04q 3/50
[50] Field of Search .......... 179/18.7 (YA)

[56] References Cited

UNITED STATES PATENTS 3,201,520 8/1965 Bereznak .......... 179/18

*Primary Examiner*—Kathleen H. Claffy
*Assistant Examiner*—William A. Helvestine
*Attorneys*—C. Cornell Remsen, Jr., Walter J. Baum, Percy P. Lantzy, J. Warren Whitesel, Delbert P. Warner and James B. Raden

ABSTRACT: Primarily, this electronic switching network is used to enable the construction and operation of truly large scale networks without sacrificing the desirable aspects of self-seeking principles. In greater detail, a self-seeking current controlled network of PNPN diodes (or similar devices) is divided, by general purpose diodes, into a plurality of electrically isolated section. The isolation sets inherent limits on offensive fan-out currents and crosstalk, and it enables self-imposed node point priming. This is done by firing crosspoints at naturally occurring oscillation frequencies which inherently speedup as the self-selection process approaches the successful completion of a latched path. Initially the oscillation is at the naturally occuring cyclic firing frequencies of the end-marked diodes at either ends of the paths. At speedup, the oscillation becomes the entire path leaping back and forth between the end-marked points. Finally, the path selection process is completed when current flows over a completed path.

INVENTOR
NIKOLA L. JOVIC

BY [signature]
ATTORNEY

SELF-SEEKING ELECTRONIC SWITCHING NETWORK

This invention relates to electronic switching systems using self-seeking networks, and more particularly to current controlled networks of the type disclosed in U.S. Pat. No. 3,204,044 entitled, "Electronic Switching Telephone System," granted Aug. 31, 1965 to Virgle E. Porter and assigned to the assignee of this invention.

In spite of the great amount of attention given to the development of electronic switching networks, there remains room for improvements. For example, much work has been done on "end marked" networks using a plurality of cascaded switching matrices. Here, the ends of a desired switching path are electrically marked and cross-point switches operate in the matrices to complete a number of paths which fan-out from at least one of the marked ends into the networks. When one of the fanning-out paths collides with something, a switching path is completed between the two end marked points. Sometimes the collision may occur in the center of the network when paths fan-out from both ends. Sometimes it occurs at a marked end point when paths fan-out in a single direction. Thereafter, all remaining ones of the fanning-out circuits are released. Networks of the described type may use gas tubes, transistors, diodes, and glass reeds, etc. for cross-points.

One trouble, which has been noted in the literature, is that the cross-point switch at the end point must carry an unduly heavy current as the fanning-out paths multiply. Some persons who have worked in the field have observed that as breakdown of the cross-points proceeds from stage-to-stage in the establishment of a path through the network, a progressively larger number of cross-points becomes conductive in each stage. Because these persons have allowed the conducting cross-points to remain latched in the low-impedance, high-current condition until the desired switch path has been completed, they have encountered a rather high current requirement which is a serious imposition upon the marking voltage source and upon the cross-points near the network terminals. Since the total cumulative current of all latched cross-points is many times the normal sustaining current of a path limited to a single series of cross-points and since the high cumulative current flows during the fractional time while a network path is being established, these persons concluded that providing cross-points capable of handling such large currents necessarily involves an inefficient use of component capabilities. Therefore, to avoid this heavy current, these persons turned to complex control circuitry which was used to select a desired path. Unfortunately, however, these control circuits are extremely complex and expensive.

Applicants's assignee owns several patents, showing different ways of avoiding the heavy current types of operations. One of these patents is the above-identified Porter patent. Among other things Porter and those who have followed his teachings have prevented excessive current at end points through a use of vertical bus capacitors which provide much of the current required for switching inside the matrix. These same capacitors control the electronic cross-point switches which turn "on" and "off" in a completely random manner until a path finds its own way through the network.

Other problems encountered in the design of end marked types of network relate to the size of the various stages. For example, each cross-point displays a capacitance while it is in the off-state. Thus, if a certain critical number (or more) of cross-point are coupled to the same horizontal or vertical busses, the cumulative capacitance connected to those busses sometimes causes unpredictable results. For example, there might be crosstalk or the cumulative capacitance might suck enough current to turn off a fired cross-point or to provide enough current to fire a turned off cross-point.

Accordingly, an object of this invention is to provide new and improved electronic switching networks. A more specific object is to provide relatively large multistage networks, especially—although not exclusively—adapted for use in telephone switching systems. Here an object is to provide a network having sections which are electrically isolated from each other by conventional low cost diodes which do not interfere with normal self-seeking searches.

Another object of the invention is to provide end-marked, electronic switching matrices having self-selecting cross-points which avoid the heavy current problems of some early types of network. In this connection, an object is to avoid expensive control circuitry.

The above-mentioned and other features and objects of this invention and the manner of obtaining them will become more apparent, and the invention itself will be best understood by making reference to the following description of an embodiment of the invention taken in conjunction with the accompanying drawings wherein.

Figure 1:
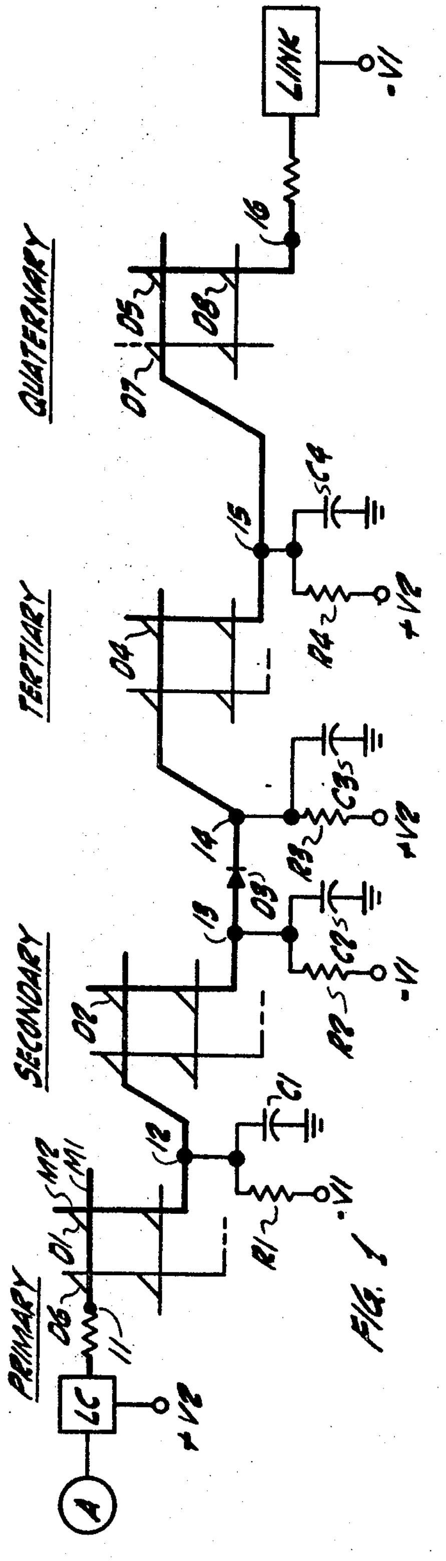
FIG. 1 shows an exemplary network having a plurality of cascaded stages separated into two electrically isolated halves by conventional diodes.

FIG. 1 includes four cascaded stages (here designated "primary," "secondary," "tertiary," and "quaternary"). These four cascaded stages are described herein as providing a switching array arranged to given automatic telephone switching service; however, it may be used for any suitable switching functions. The cross-point groups may be enlarged or reduced in size to include a greater or lesser number of lines. Also, the switching technique used by the invention is not limited to four stages; it applies equally well to any convenient number of switching stages.

An exemplary subscriber line A is connected via a line circuit LC to the inlets of the primary stage. A number of control circuits—such as links, registers, or other circuits—are connected to the network outlets, as indicated by the word LINK. These circuits control the calls which are extended through the network and provide any necessary or desirable call functions such as: dial tone, busy tone, conversation timing, or the like.

In the idle state, both ends of the matrix are normally marked with ground potential. To request a switching path through this network, a subscriber line circuit LC marks one end of the desired path with a voltage of one polarity (such as +18 v.), and an allotted control circuit marks the other end with a voltage of opposite polarity (such as −18 v.). Each matrix includes any suitable number of first and second (or horizontal and vertical) multiples, two of which are shown at M1, M2 respectively. Electronic switches, preferably PNPN diodes (one of which is indicated at D1), are connected across each cross-point. Thus, when the cross-point switch is turned "on" the intersecting multiples M1, M2 are electrically connected together, and when the switch is turned "off," the intersecting multiples are electrically isolated from each other.

These electronic switches turn themselves "on" or fire when a voltage in excess of a "firing" potential is applied across their terminals. In greater detail, in the idle state, each of the vertical multiples is normally biased through an individually associated RC network such (as resistor R1, capacitor C1) to a first or common reference potential. Therefore, a cross-point (such as D1) fires when the intersecting horizontal multiple M1 is marked by a second potential which exceeds a firing potential relative to the idle vertical marking. After a cross-point D1 fires, the marking potential on the horizontal multiple charges the capacitor C1 connected to the intersecting vertical multiple. When the capacitor C1 charges sufficiently, firing voltage appears on a horizontal multiple in the next cascaded matrix. Thus, the marking potential is passed on, stage-by-stage, to each succeeding cascaded matrix where the diodes fire in a similar manner.

The end-marking is a firing pulse which provides a charging current through the fired diode to the capacitor. If there is a completed path from the demanding subscriber line to an allotted link, the charging current is replaced by a holding current before the capacitor is charged. This holding current keeps the fired diode "on." If the holding current does not appear before the capacitor is sufficiently charged, the diode starves for want of current and switches "off." After the diode switches "off," the potential of the charge stored on the capacitor is a reverse bias potential which holds the diode "off" momentarily. Later, the charge drains off the capacitor through the associated resistor thereby removing the reverse bias from the diode. Thus, the diodes might be viewed as multivibrators which switch "on" and "off"—or oscillate—at a cyclic rate set by the RC time constant (the frequency being designated $f_{pn}$ in FIG. 3).

The drawing shows that a first section of the network (the primary and secondary matrices) is biased with a potential of one polarity (−V1), and a second section of the network (the tertiary and quaternary matrices) is biased with a potential of opposite polarity (+V2). It will, hereinafter, be convenient to refer to these voltages as −18 v. and +18 v., respectively. These two network sections are isolated from each other by a general purpose diode D3 which is normally back biased by the bias potentials −V1 and +V2. Hence, during the normal quiescent conditions, the two sections of the network are electrically isolated from each other. Therefore, currents flowing through any end-marked diodes are usually blocked by the general purpose diode D3 as long as no path has been completed through the network.

According to the invention, there cannot be any offensive fan-out currents, double path seizures cannot occur, there is a self-seeking search, a complete search may be made for every call, and no complicated controls are required. In greater detail, since paths in the first section do not terminate if they reach a back biased general purpose diode, there is no prolonged current flow. Even if it were assumed that far too many diodes turn on during any search, the excessive current would be a momentary pulse because the paths do not terminate. During these very brief pulse time periods, PNPN diodes can carry extremely heavy currents with no problems whatsoever. Thus, the problems mentioned in the literature do not cause trouble.

The problem to which the invention is primarily directed is also solved by the isolation given by the general purpose diode D3. As the matrix becomes larger, the total capacitance of all parallel connected diodes tend to accumulate. Before the network size reaches the cumulative capacitance levels causing crosstalk, or any of the other bothersome problems, the network section is isolated.

Figure 2:
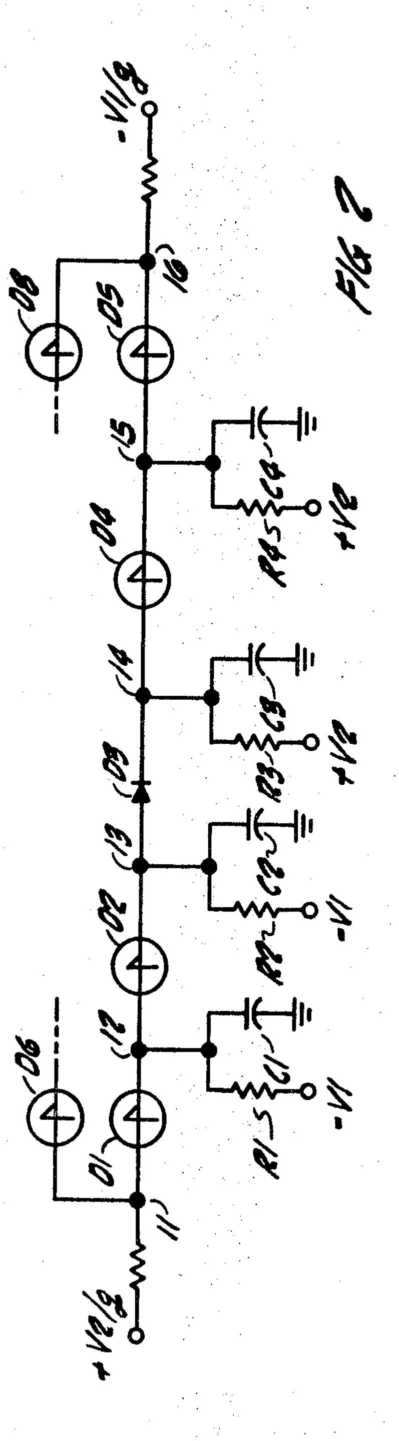
FIG. 2 shows a single path taken from the network of FIG. 1.

The nature of the invention will become more apparent from a description of how the network behaves when a path is completed through it. To facilitate this description, it will be convenient to refer to the firing of a single path through the network. This path is shown in FIG. 1 by a heavy inked line, and shown in detail in FIG. 2.

Figure 3:
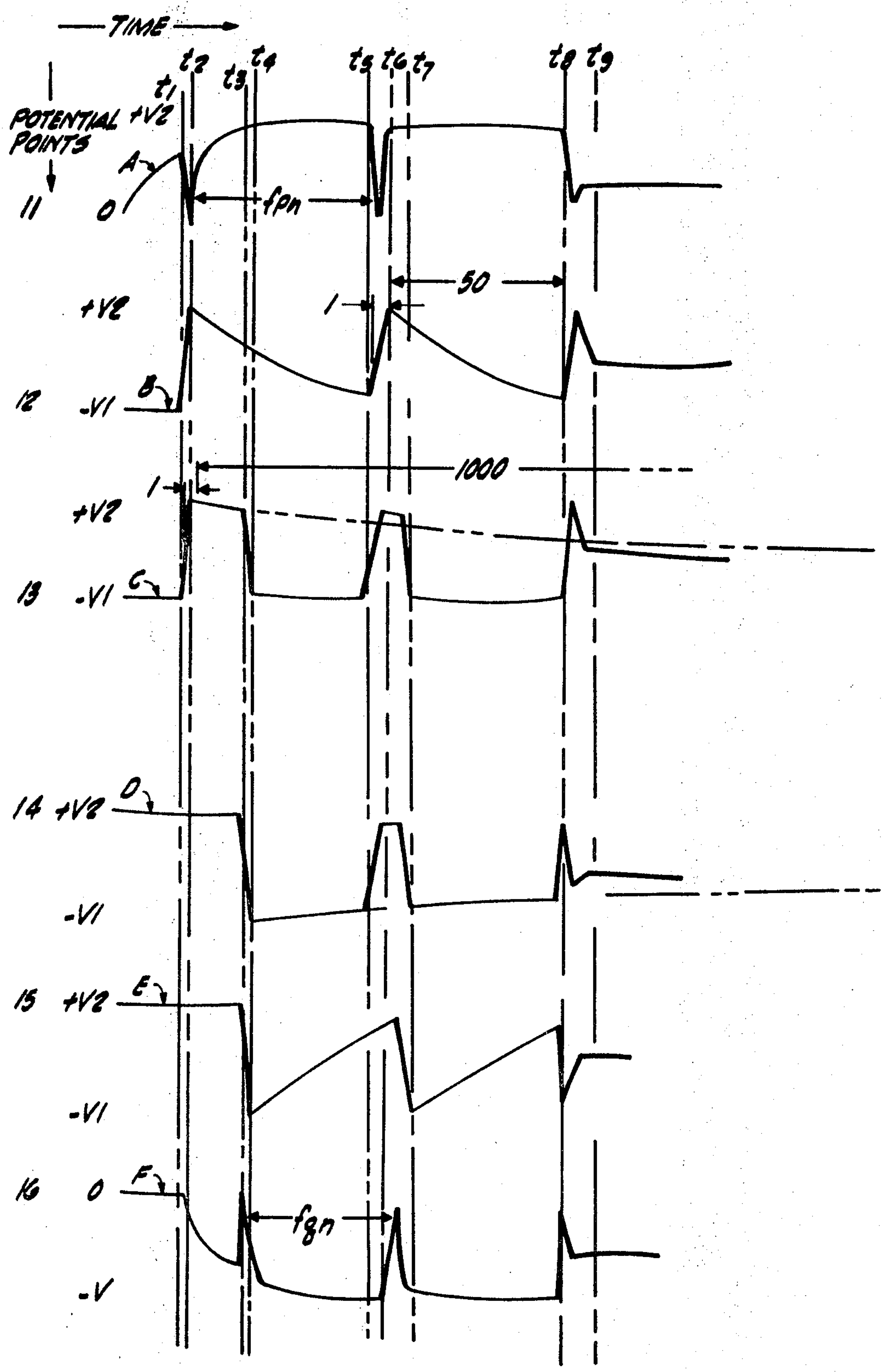
FIG. 3 shows the voltage and current changes which occur on the switch path of FIG. 2 when each of the diodes fires.

It will be noted that each side of a diode in the speech path is designated by one of the reference characters 11—16. The curves of FIG. 3 show how the voltage varies at each of points 11—16. The curves A-C are voltages appearing in the left-hand isolated section of the network. The curves D—F are mirror images of the curves A—C, and they represent voltages appearing in the corresponding parts of the right-hand isolated section of the network. The heavily inked parts of these curves indicate that current is flowing while an appropriate diode is conducting. The lightly inked parts of the curves indicate potentials with no current flow while the appropriate diode is turned off. On curve B, near time *t6*, there are the notations "1" and "50" which indicate that a primary diode (such as D1) is turned of and the associated capacitor (such as C1) discharges over a period which is about fifty times longer than the period during which the diode is turned on. A similar notion on curve C indicates that there is a thousand to one ratio of capacitor discharge time to diode "on" time for the secondary diode D2 and its associated capacitor C2. When drawing these curves, efforts were made to bring out a principle therefore, they should not be viewed as a rigorously accurate representation of the actual voltage and current variations. In reality, there are many factors—some being randomly variable—which cannot be accurately given by curves such as these. Also, the specific voltages mentioned here are merely for convenience of description—other suitable voltages could be provided.

An end-marking pulse may be applied to the point 11, with a resulting voltage and current, as shown by curve A. The voltage raises from ground toward a firing voltage, here shown as +18 v. At time *t1*, PNPN diode D1 fires, and current flows while the voltage at point 11 dips toward the idle biasing potential applied through resistor R1. If no path is completed, diode D1 starves and turns off. The voltage climbs back toward the firing voltage, +18 v. This time, however, diode D1 cannot fire because capacitor C1 is storing a charge which it acquired responsive to current flow immediately after time *t1*. The stored charge back biases the diode D1 momentarily. After a period of time, the charge on capacitor C1 leaks off through the resistor R1. The back bias is removed, and the diode D1 refires (time *t5*). Hence, the combination of diode D1, resistor R1, and capacitor C1 may be viewed as a free running oscillator having a fixed period: *t1*—*t5*; *t5*—*t8*; etc.

A marking pulse of opposite polarity is applied from the link to the point 16, with the results shown by curve F. For reasons pointed out in connection with curve A, the combination of the PNPN diode D5, resistor R4, and capacitor C4 may also be viewed as a free running oscillator having a fixed time period: *t3*—*t6*; *t6*—*t8*; etc., and the natural $f_{qn}$.

By an inspection and comparison of curves A and F, it should be apparent that the two circuits including the PNPN diodes D1, D5 are oscillating at slightly different frequencies—$f_{pn}$ and $f_{qn}$, respectively. Also, the firing pulses appearing at the points 11 and 16 rise cyclically from ground to the firing potentials +18 v. or −18 v. at slightly different time positions. The firing pulse in curve F is drawn arbitrarily to show that it starts at approximately the time *t1* when the firing pulse in curve A has already raised to a firing voltage. These differences are drawn into the curves merely to represent randomly occurring variables, which may appear in the circuits. The curves A and F could be identical mirror images of each other; or, they could vary in some other undisclosed manner.

Also, there are many other PNPN diodes in parallel with the diodes D1 and D5. For example, FIG. 1 shows a diode D6 in parallel with diode D1 and a diode D8 in parallel with diode D5. It should be understood that another entirely separate family of curves (similar to FIG. 3) could be drawn for each of these parallel connected diodes, and they would also display random variables.

Each time that PNPN diode D1 turns on (the heavily inked parts of curve A), it applies a firing voltage to the PNPN diode D2. Diode D2 then fires if it is idle. Thus, curve B shows that diode D2 fires, and then turns off at times *t2*, *t6*. Likewise diode D4 is fired each time that diode D5 fires. Thus, curve E shows that diode D4 fires, and then turns off at times *t4*, *t7*. The lightly inked lines between *t2*—*t5* and *t6*—*t8* (curve B) represent the discharge of capacitor C1 through resistor R1; a similar representation for capacitor C4 appears in curve E. At time *t8* all diodes conduct, the path is completed, and the heavily inked line shows a continuous holding current at time *t9*.

Looking specifically at times *t2*, one sees that the PNPN diodes D1, D2 fire while diode PNPN D4 is turned off. Thus, current cannot flow over a completed path. Diodes D1, D2 starve and turn off. While diode D2 is turned on, the point 13 stands at the +V marking voltage. Point 14 is at the same +V voltage applied through resistor R3. Thus, the general purpose diode D3 does not conduct, and is not too likely that the back bias will be removed, but that point is not relevant. As shown by curve C at time *t2*, the capacitor C2 stores a charge of about +18 v. after the diode D2 has turned off. This charge would normally leak off very slowly through resistor R2, as shown by the dot-dashed line (again, it may be assumed that the discharge takes 1,000 times longer than the charging time).

At time *t3*, the PNPN diode D4 fires responsive to the −18 v. and marking at point 16. The capacitor C3 charges, as shown by the curve D. When the point 14 reaches the −V voltage, the point 13 is at a +V voltage as a result of the charge stored on the capacitor C2. Hence, the general purpose diode D3 conducts, and the capacitor C2 discharges as shown by curve C, at the time *t3*.

The voltage at the point 13 changes from +18 v. toward −18 v. Therefore, it is likely that PNPN diode D2 will fire. Since the point 11 stands at the +V voltage of the end marking pulse, perhaps diodes D1 will also fire to complete the path. However, for descriptive purposes, it is assumed here that these reverse firings do not occur at this time.

The resistor R3 is very large so that the capacitor C3 discharges very slowly, as indicated by the dot-dashed line associated with the curve D (again the charge to discharge time ratio may be 1:1000).

At time *t5*, the charge on capacitor C1 has leaked away to establish a bias voltage adequate to again fire the PNPN diode D1, as indicated by curve A. This, in turn, fires the diode D2 as indicated by curve B, and recharges the capacitor C2, as indicated by the curve C. The capacitor C3 discharges through the general purpose diode D3, as indicated by the curve D. The voltage at point 14 changes from −18 v. toward +18 v., and probably it would fire the PNPN diode D4 if curve E has a voltage time relationship which causes a sufficient voltage difference across the diode D4. Here again, it is assumed that this does not happen.

Thus far, the description has illustrated the manner in which the charging of the capacitors C2, C3 follow the firing of the associated PNPN diodes D2, D4. The discharging of the capacitors C2, C3 follows the firing of the diodes—D4, D2 respectively—connected on the opposite sides of the general purpose isolation diode D3. Each time that the capacitors C2, C3 charge or discharge, there is an opportunity for a path to fire through the network. Thus, there have been four opportunities for a path to fire.

For descriptive purposes, the curves have been drawn at the time *t8* so that the naturally occurring oscillating frequencies coincides, and both of the PNPN diodes D1 and D5 fire simultaneously, as indicated by curves A and F. This means that both of the diodes D2, D4 fire about simultaneously, as indicated by the curves B, E. The path is completed, and the general purpose isolation diode D3 is forwardly biased. Current flows from the +V voltage at the point 11 to the −V voltage at the point 16. The flow of current latches the PNPN cross-points D1, D2, D4, D5 in their on condition.

It is important to note that there could not be any sustained current until a path is completed and latched "on." Thus, regardless of the number of diodes which may turn on at any given time, there cannot be any offensive fan-out current.

The foregoing description includes several assumptions which are "idealized" situations that occur primarily because it is convenient to describe them. However, it is extremely unlikely that the two-end marked diodes will turn on simultaneously at such a convenient time. Also, it is very likely that parallel connected diodes such as D1, D6 and D5, D8 (FIG. 2) will sometimes interfere with each other. Therefore, the following description explains four cases or situations, which could occur during firing. These four cases shown that a path is completed regardless of whether the two-end marked diodes do or do not fire simultaneously.

Figure 4:
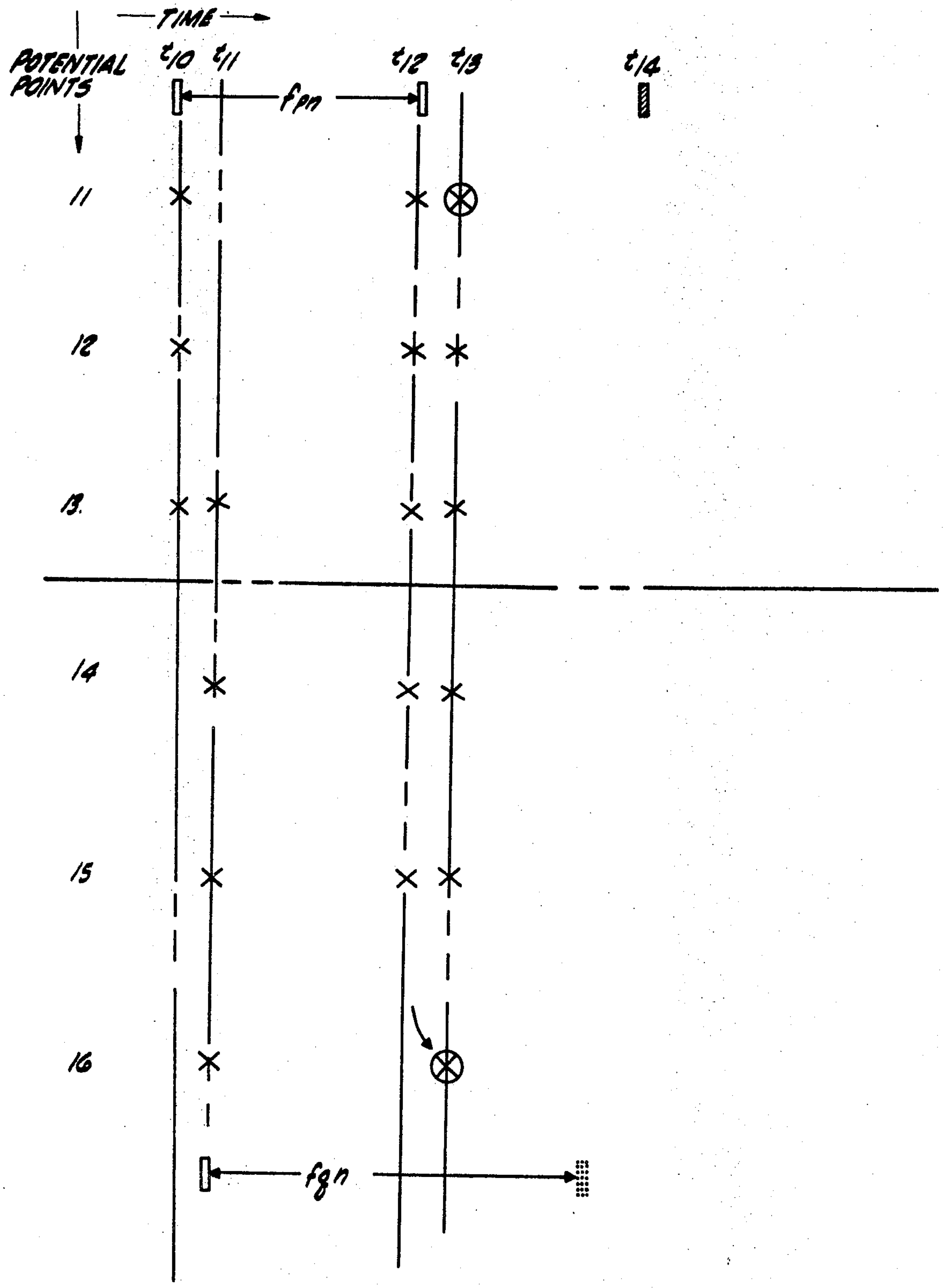
FIG. 4 helps to explain four cases of searching problems which may occur during the extension of a path through the network.

For this description, reference is made to FIG. 4. The two digit time scale notation (*t10*—*t13*) is used in FIG. 4 merely to avoid confusion with the one digit time scale notation (*t1*—*t9*) used in FIG. 3. There is no intended interrelation between the two time scales. The time *t10* does not necessarily imply either the time *t1* or an instant following the time *t9*. The left-hand column of FIG. 4 contains the notations 11—16, which refer to the potential points 11—16 in the other FIGS.

Glancing down FIG. 3, between the times *t1*, *t2*, one notes heavily inked lines which indicate a current flow while the associated cross-point diodes are turned on. Glancing down FIG. 4, at time *t10*, one notes X marks with the same meanings. Glancing up FIG. 3, between times *t3*—*t4* and up FIG. 4 at time *t11*, one notes X marks having a similar relationship for indicating current flow through associated cross-point diodes which are turned on. Thus, the relationship between FIGS. 3, 4 should be obvious.

Means are provided for repeatedly causing self-seeking search attempts to be made alternately from opposite sides of the network, with the attempts initially occurring at the natural frequencies, $f_{pn}$ and $f_{qn}$, and for collapsing the time scale of such repeated search attempts to bring them together at an instant of firing. The manner of making the repeated search attempts is brought out in FIG. 4 where four exemplary cases are illustrated as diode firings which occur at times *t10*—*t13*. The first search, at time *t10* is in the direction extending from point 11 toward point 16. The second search, at time *t11*, is in the direction extending from point 16 toward point 11. The third search, at time *t12*, extends from point 11 toward point 16. The fourth search, at time *t13*, extends from point 16 toward point 11. Please note that the searches occurring at times *t10*—*t12* are responsive to the end-marking firing pulses (indicated by the hollow inked vertical dashes, at the tops and bottoms of the figure indicating firing pulses). But, the search occurring at the time *t13* is self-initiating (there is no hollow inked vertical dash indicating a firing pulse). This search is made responsive to the charges stored on the capacitors. The time scale has collapsed from the natural oscillating frequency set by the end-marking firing pulses (curves A, F, FIG. 3) to a self-sustaining oscillation of the path itself as partial paths fan-out from each marked end toward completion of a path.

For firing, it is necessary for an interaction between the two halves of the network which are separated by the general purpose diode D3. However, such interaction, per se, is not sufficient to cause switching. It is also necessary for the diode subjected to a firing voltage to have characteristics which makes the specific diode fire under the prevailing conditions. The interaction is a network function, and the diode is a cross-point function. To achieve switching, these two functions must coincide.

In greater detail, as the charge dissipates from capacitor C1, the diode D1 continues to have a +18 v. positive firing voltage on one side (at point 11) and any positive charge (such as +10 v.) on the other side (at point 12), thus leaving a net difference of 8 v. across the diode. Obviously, the diode D1 cannot fire if its lowest firing potential is responsive to a difference of, say, 12 v. However, if a negative voltage is applied by an end-marking at the other side of the network, a high voltage difference appears across diode D2. Thus, looking from point 16 toward point 12, the firing voltage adds to the positive charge on the capacitor C1. If the point 13 moves to, say, −15 v. and the charge on capacitor C1 causes the point 12 to stand at the same +10 v. (as assumed above), the net difference across the diode D2 is 25 v. This leads to the conclusion that when the two sides of the network are interacting, after a search in one direction and while the capacitors store a resulting charge, the diodes are reversely biased with respect to the firing pulse which has just caused them to turn on and then off. At this time, diodes are forwardly biased with respect to the firing pulse of opposite polarity at the opposite side of the network.

For convenience of expression, the charges remaining on the capacitors after a search attempt are referred to hereinafter as "self-imposed node point priming voltages." The term "self-imposed" is intended to distinguish over more complicated prior art systems wherein a computerlike common control device had to survey busy and idle conditions, make a routing decision to select the best route, and then apply a priming potential at each pertinent node point. In both the inventive system, and the prior art system, the priming potential is used so that the path is forced into the channels that are selected by the priming potentials.

Case 1 is the situation illustrated at time $t10$, which occurs when there is no interaction between the two parts of the network. A positive firing potential, moving from 0 v. toward +18 v., is applied at point 11. A path finds its way through the first part of the network, but it is not completed, and there is no holding current. The fired PNPN diodes starve and switch off, leaving a positive potential on the pertinent capacitors. For example, the X at 13 (FIG. 4) indicates that the firing pulses has left a positive charge on the capacitor C2 (FIG. 2) after the PNPN diode D1 turns off.

Case 2 occurs when there is an interaction between the network halves and a path searches back through the network after an unsuccessful search has been made through the network in the opposite direction. The self-imposed between cases 1 and 2 is that now the self-imposed priming potentials appear at certain node points.

An end-marked diode breaks down at the other side of the network (i.e. the side opposite to the side where the diode breaks down during the next preceding search). A situation such as this occurs at time $t3$ in FIG. 3 and at time $t11$ in FIG. 4. An assumption is made that the search extends through a part of the network and then fails, for any of many reasons, despite the self-imposed priming potentials which mark the path at the start of the search.

Case 3 occurs when the cumulative, self-imposed node priming potentials have reached a fairly high state relative to the end-marking firing potential so that the path would necessarily be completed except for something causing interference on the path to inhibit completion. For example, it is possible that diode D5 (FIG. 2) cannot fire because a parallel diode D8 connected to common node point 16 is turned on to drive the firing potential at that node point to a back biased inhibiting potential.

At time $t12$, the firing pulse applied to point 11 fires all PNPN diodes except for the last one (diode D5). In case 2, time $t11$, the failure to reach point 12 may or may not have been caused by interference between parallel connected diodes in two self-seeking paths. However, it is almost certainly true that the failure to reach point 16 is caused by such an interference at time $t12$. Diode D8 must be turned on at this time.

Case 4, time $t13$, occurs when the interfering diode turns off while the self-imposed node priming potentials are at a substantially high voltage level. When diode D8 turns off, the priming charge on capacitor C4 imposes a forward bias on the anode of diode D5, and that bias is so strong that the negative end-marking voltage fires the diode. The negative end-marking voltage returns to point 16. As the voltage shoots up, the diode D5 fires. Since all other node points in a given path are primed to a potential very near the firing voltage, all other pertinent diodes fire on the rate effect. It is assumed that the path is completed at time $t13$; therefore, an X mark appears in every pertinent spot. The X marks at either end of the vertical column $t13$ are encircled to indicate that the corresponding end-marked diode fires responsive to the self-imposed node point priming as distinguished from the end-marking firing pulse which is indicated by a hollow inked vertical dash.

If the assumption had been that diode D6 is on at this time, but turns off almost immediately, the diode D1 would not fire to complete the path at time $t13$. It would fire an instant later when diode D6 goes off. The self-primed diodes would turn on again an instant later. In this manner, the end-marked diodes no longer oscillate at their natural frequency which would indicate that the next firing after time $t12$ would occur at time $t14$. That is the natural oscillation frequency set by the diodes own inherent characteristics and by the time constant of the associated RC network. Thus, the path itself goes into oscillation firing from one end of the network toward the other, and then back again. As this happens, the time scale collapses, and it is no longer necessary to have the end-marked diodes fire as a result of inherent oscillations and in its own firing order.

Briefly, in resume, the firing pattern begins at the natural frequencies $f_{pn}$ and $f_{qn}$ of the end-marked diodes in the primary and quaternary matrices, respectively. Then, the firing pattern changes from these natural frequencies to a new frequency, which is the intranetwork frequency at which the path leaps back and forth between the end-marked points. This new frequency tends to approach the fastest frequency in the pertinent part of the network. That is, each diode turns on and off at a rate set by the diodes internal characteristics and its associated RC network. The fastest of these rates tends to control the ultimate intranetwork frequency, which is approached asymptotically.

While the principles of the invention have been described above in connection with specific apparatus and applications, it is to be understood that this description is made only by way of example and not as a limitation on the scope of the invention.

I claim:

1. An electronic switching network comprising a plurality of self-selecting current controlled cross-points divided into at least two electrically isolated sections by general purpose diodes, means for applying end-marking voltages of opposite polarities to cross-points on opposite sides of the network, and means responsive to said end-markings for causing the cross-points at each end of a selected path to turn on and off at naturally occurring frequency until a completed path finds its own way through said network, said general purpose diode being located at points in said network which preclude a flow of current over partially completed paths.

2. The network of claim 1 wherein there are two of said isolated sections, means including one polarity of voltage biasing the cross-points in one of the isolated sections, and means including an opposite polarity of voltage for biasing the cross-points in the other of said isolated sections, the end-marking voltage applied to said one section having said opposite polarity, and the end-marking voltage applied to said other section having said one polarity.

3. The network of claim 2 wherein said cross-points are arranged in horizontal and vertical multiples and said biasing potentials are applied to said vertical multiples via RC networks, the ratio of discharge time of a capacitor in said RC networks relative to the turned on time of associated cross-points being selected to maintain self-imposed node point priming potentials during an interval while a switch path is being completed.

4. The network of claim 3 wherein said cross-points are arranged in four cascaded matrices, the ratio of cross-points on time to capacitor discharge time being in the order of 1:50 in the two matrices at the outside ends of the cascade and in the order of 1:1000 in the two matrices in the center of the cascade.

5. The network of claim 4 wherein said general purpose diode is connected between the two matrices in the center of the cascade.

6. An electronic switching network comprising a plurality of cascaded matrices forming a self-seeking current controlled network, switching means in each matrix forming a plurality of cross-points interconnected at common node points, current limiting means interposed between the two central matrices of said network for isolating the partially completed paths on each side of said current limiting means, means for applying end-marking potentials to the two matrices at the respective opposite ends of said network, the switching means in the end matrices responsive to end-marking potentials applied thereto to complete partial paths toward the interior matrices of said network, and means biasing successive inward matrices with a polarity opposite to the end-marking potentials during each successive one of said attempts in order to prepare a number of switching means to fire a complete path through the network during successive attempts.

7. A network as claimed in claim 6, wherein said end-marking potentials are of opposed polarities and the respective biasing means in matrices adjacent each end impose bias opposite in polarity to the respectively nearest end-marking potential.

8. A network as claimed in claim 7, wherein said switching means comprise PNPN diodes at each cross-point of each matrix.

9. A network as claimed in claim 7, wherein said biasing means comprise a voltage source and a grounded RC network.

10. In a large scale electronic switching network operating responsive to end-marking potentials applied at opposite ends of selected paths, said network comprising a plurality of current controlled cross-points interconnected at node points and divided into a plurality of cascaded switching sections, the cross-points in said network turning on and off to complete said path on self-seeking, current controlled principles; the combination comprising: means including general purpose diodes connected between sections for electrically isolating the sections on both sides of said diodes to limit the number of partial paths through the network and thereby set inherent limits on offensive fan-out currents and crosstalk, and means for applying bias opposite in polarity to the end-marking potentials voltages responsive to the cyclic firing of end-marked cross-points at naturally occurring oscillation frequencies to thereby speed-up the firing of cross-points as path selection approaches the successful completion of a complete path through said cascaded sections.